(12) United States Patent
Namai et al.

(10) Patent No.: US 6,456,508 B1
(45) Date of Patent: Sep. 24, 2002

(54) DRIVE APPARATUS FOR VIBRATING-TYPE COMPRESSOR

(75) Inventors: Masao Namai; Naoki Akazawa, both of Nitta-machi (JP)

(73) Assignee: Sawafuji Electric Co., Ltd. (JP)

( * ) Notice: Subject to any disclaimer, the term of this patent is extended or adjusted under 35 U.S.C. 154(b) by 0 days.

(21) Appl. No.: 09/739,310

(22) Filed: Dec. 18, 2000

(30) Foreign Application Priority Data

Dec. 20, 1999 (JP) .......................... 11-360138

(51) Int. Cl.[7] .................. H02M 3/335; H02M 7/53
(52) U.S. Cl. .................... 363/17; 318/116; 417/11
(58) Field of Search ........................ 363/17, 56, 16, 363/19, 25, 26, 131, 127, 132, 37, 39; 318/116, 801, 807, 803; 417/45, 44, 11, 416

(56) References Cited

U.S. PATENT DOCUMENTS

| | | | |
|---|---|---|---|
| 4,535,399 A | * | 8/1985 | Szepesi .................... 363/41 |
| 5,742,492 A | * | 4/1998 | Akazawa et al. ........... 363/26 |
| 5,748,458 A | * | 5/1998 | Ochiai ..................... 363/17 |
| 5,793,623 A | * | 8/1998 | Kawashima et al. ........ 363/56 |

FOREIGN PATENT DOCUMENTS

| | | |
|---|---|---|
| JP | 07111781 | 4/1995 |
| JP | 08066043 | 3/1996 |

* cited by examiner

*Primary Examiner*—Rajnikant B. Patel
(74) *Attorney, Agent, or Firm*—McGlew and Tuttle, P.C.

(57) ABSTRACT

A drive apparatus for a vibrating-type compressor includes a DC power source as well as an inverter including switching elements. The inverter is adapted to convert direct time to alternating current through alternating switching of the switching elements. An inverter control unit is provided for controlling the alternating current supplied from the inverter to the vibrating type compressor. A DC power supply comprises a first power supply including a DC/DC converter. A second power supply is provided including an AC/DC converter. A diode OR circuit is connected to the first and second power supplies. A further circuit is provided which, upon detection of a voltage output from the second power supply, operates to stop the output of the first power supply via a DC/DC converter control unit for controlling the DC/DC converter.

20 Claims, 15 Drawing Sheets

Fig. 7
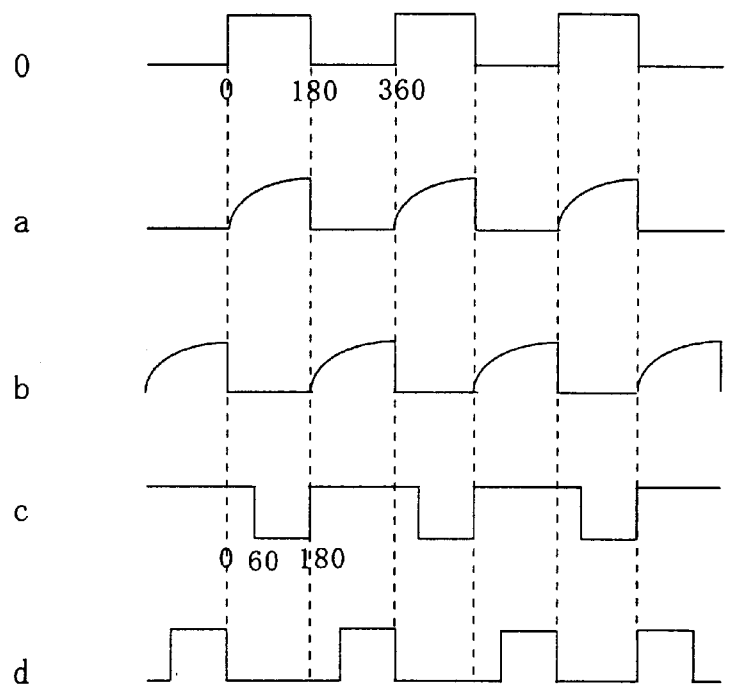
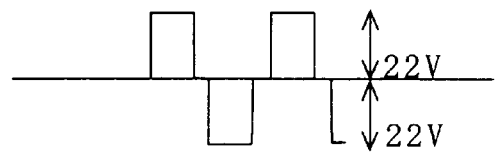
Fig. 8A
Fig. 8B
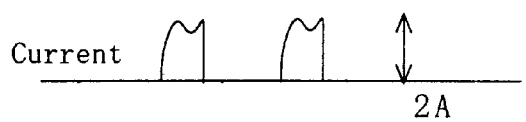
Fig. 8C
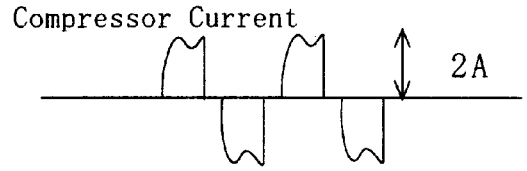
Fig. 8D
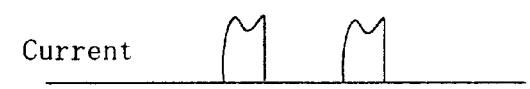
Fig. 8E

DRIVE APPARATUS FOR VIBRATING-TYPE COMPRESSOR

BACKGROUND OF THE INVENTION

1. Field of the Invention

The present invention relates to a drive apparatus which is used in conjunction with a vibrating-type compressor and is configured to supply electrical power to the compressor by use of an inverter, and, more particularly, to a drive apparatus for a vibrating-type compressor which enables use of both AC and DC power sources without use of a mechanical changeover unit.

2. Description of the Related Art

Conventionally, an AC/DC power supply apparatus as shown in FIG. 14 (from Japanese Patent Applications Laid-Open (kokai) No. 7-111781) has been used as a drive apparatus for a vibrating-type compressor. In FIG. 14, reference numeral 1 denotes a vibrating-type compressor which is used as part of a refrigerator and operates upon receipt of a low AC voltage of, for example, 12 V or 24 V. Reference numeral 2 denotes a DC power source such as a battery which is mounted on a vehicle and which outputs a DC voltage of 12 V or 24 V.

Alternating current from a commercial AC power source 10 is converted to direct current by an AC/DC converter 8 in order to obtain a DC voltage equal to the DC voltage E obtained from the battery 2. One of the DC voltage E output from the battery and the DC voltage output from the AC/DC converter 8 is selected by an automatic changeover unit and is converted to an AC voltage by an inverter 6. The thus-obtained AC voltage is supplied to the vibrating-type compressor 1. The inverter 6 includes a first transistor 52 and a second transistor 53. These transistors 52 and 53 are turned on alternately in order to generate the AC voltage.

The voltage E output from the battery 2 or the AC/DC converter 8 is applied to the first transistor 52, whereas a voltage -E output from a polarity inversion circuit 3 is applied to the second transistor 53. The polarity inversion circuit 3 includes a transistor 11, a pulse generation circuit 12, a choke coil 13, a diode 14, and a capacitor 15 and outputs a DC voltage -E, whose polarity is opposite the DC voltage E with respect to ground.

A control unit 7 variably controls the AC voltage output from the inverter 6 by means of changing the duty ratios of respective output waveforms of the first and second transistors 52 and 53, to thereby change the frequency of the AC voltage applied to the vibrating-type compressor 1.

The resonance frequency of the vibrating-type compressor 1 changes depending not only on variation in load but also on the environment in which the vibrating-type compressor 1 is used. Therefore, if the frequency of the AC voltage supplied to the vibrating-type compressor 1 is maintained constant, the efficiency of the vibrating-type compressor 1 is low. In view of this problem, there has conventionally been used a technique for controlling the frequency in order to minimize the difference between the first-half peak and the second-half peak within each period of the waveform of current flowing through the vibrating-type compressor 1, to thereby maximize the efficiency of the vibrating-type compressor 1.

A frequency following circuit 24 shown in FIG. 14 compares the average value of current flowing through a shunt resistor 20 during a first half of a single waveform period of an oscillation signal output from an oscillator 21 and that during a second half of the period and outputs a control signal for variably controlling the oscillation frequency of the oscillator 21 such that the difference assumes a predetermined value. Accordingly, the oscillator 21 generates a pulse signal of a frequency corresponding to the control signal, which pulse signal is then subjected to frequency division effected by a frequency divider 22. A pulse signal output from the frequency divider 22 is supplied to a transistor control circuit 23 in order to control the first and second transistors 52 and 53. Therefore, the power supply apparatus can generate AC voltage whose frequency follows variation in resonance frequency caused by variation in the load of the vibrating-type compressor 1, and thus can drive the vibrating-type compressor 1 at maximum efficiency.

However, such a conventional drive apparatus may break, because it has mechanical contacts within the automatic changeover unit. Further, during AC input, conversion of AC→DC→DC→AC is performed, conversion efficiency is low, and therefore a relatively large amount of electrical power is consumed.

The inverter of the conventional drive apparatus outputs voltage which assumes a square waveform such that the signal assumes an on level potential during a first 180°-phase period within each period of the waveform and an off level potential during a second 180°-phase period within each period of the waveform. Since the voltage applied to the vibrating-type compressor 1 assumes not a sinusoidal waveform but a square waveform having a 180° positive period and a 180° negative period, the operation efficiency of the vibrating-type compressor 1 has been low.

When the above-described power supply apparatus is used, an AC voltage signal whose potential changes between positive and negative with respect to the zero potential is applied to the vibrating-type compressor. Therefore, one terminal of the vibrating-type compressor can be grounded, thereby enabling a cord to be connected to the casing itself of the vibrating-type compressor. However, a polarity inversion circuit as described has been required, in order to enable connection of a cord to the casing.

SUMMARY OF THE INVENTION

In view of the foregoing, an object of the present invention is to provide a drive apparatus for a vibrating-type compressor which solves the above-described problem.

Specifically, a first object of the present invention is to provide a drive apparatus for a vibrating-type compressor which employs a configuration which eliminates a mechanical changeover unit for effecting changeover between AC and DC and in which a commercial AC power source is connected to an inverter unit via an AC/DC converter and a diode OR circuit in order to eliminate mechanical contacts from the power system to thereby decrease failure rate; i.e., to improve reliability.

A second object of the present invention is to provide a drive apparatus for a vibrating-type compressor in which in place of conversion of AC→DC→DC→AC, conversion of AC→DC→AC is effected during AC input in order to improve conversion efficiency and reduce power consumption.

A third object of the present invention is to provide a drive apparatus for a vibrating-type compressor in which FETs disposed in the upper and lower arms of the inverter are turned on alternately such that each FET is in an on state over a 100° to 140° phase angle, whereby as compared with 180° alternating supply of electricity, a wave closer to a sinusoidal wave is supplied to the vibrating-type compressor to thereby improve the operation efficiency of the vibrating-type compressor itself.

A fourth object of the present invention is to provide a drive apparatus for a vibrating-type compressor in which the on period over a 100° to 140° phase angle is slightly changed on the basis of the detected ambient temperature of the vibrating-type compressor, whereby the efficiency is improved further, and a valve-hitting phenomena peculiar to vibrating-type compressors is prevented.

A fifth object of the present invention is to provide a drive apparatus for a vibrating-type compressor which can cope with a wide range of input voltage, including AC 100 V, AC 200, DC 12 V, and DC 24 V, and which can detect a drop in the power source voltage regardless of the input voltage changing in the wide range.

A sixth object of the present invention is to provide a drive apparatus for a vibrating-type compressor which enables one end of the vibrating-type compressor to be grounded without provision of a polarity inversion circuit for generating a negative power source.

A seventh object of the present invention is to provide a drive apparatus for a vibrating-type compressor which enables reliable and accurate detection of the difference between a first-half peak and a second-half peak of a current waveform regardless of variation in frequency.

A drive apparatus for a vibrating-type compressor according to the present invention comprises a DC power source; an inverter 6 including switching elements and adapted to convert direct current to alternating current through alternating switching of the switching elements; and an inverter control unit 7 for controlling the alternating current supplied from the inverter 6 to the vibrating-type compressor 1. The DC power supply comprises a first power supply including a DC/DC converter 17 for converting direct current from a battery to direct current of a different voltage; a second power supply including an AC/DC converter 8 for converting alternating current from a commercial AC power source to direct current; a diode OR circuit (diodes 25 and 26) to which are connected the first and second power supplies; and a circuit which, upon detection of a voltage output from the second power supply, operates to stop the output of the first power supply via a DC/DC converter control unit 27 for controlling the DC/DC converter 17.

The drive apparatus for a vibrating-type compressor according to the present invention is preferably configured in such a manner that one of two output terminals of the first power supply and one of two output terminals of the second power supply are grounded; the grounded terminals are connected to one end of a first switching element (FET 5) of the inverter 6, while the other end of the first switching element (FET 5) is connected in series to one end of a second switching element (FET 4); and a voltage output from the OR circuit is supplied to the other end of the second switching element (FET 4). A current detection resistor (R) is connected in series to one of the two switching elements (FETs 4 and 5). The connection point between the two switching elements (FETs 4 and 5) is connected to one end of the vibrating-type compressor 1 via a capacitor 19, and the one end of the first switching element (FET 5) is connected to the other end of the vibrating-type compressor 1. Thus, the other end of the vibrating-type compressor 1 can be grounded.

The inverter control unit 7 of the drive apparatus for a vibrating-type compressor according to the present invention is preferably configured in such a manner that the inverter control unit 7 controls the on period within each switching cycle of the alternating switching operation of the switching elements within a phase angle range of 100° to 140° and that the on period of 100° to 140° is varied on the basis of a detected ambient temperature of the vibrating-type compressor.

The inverter control unit 7 of the drive apparatus for a vibrating-type compressor according to the present invention is preferably configured in order to detect and hold a first peak of current flowing during a half cycle of an AC output in which the first or second switching element enters a conductive state alternately, detect a timing at which the current reaches the held peak, and control the timing of the alternative switching of the two switching elements of the inverter to thereby variably control the output frequency of the inverter.

Further, the drive apparatus for a vibrating-type compressor according to the present invention preferably comprises a constant voltage generation circuit 28 for supplying a constant voltage for control use to the inverter control unit 7 and the DC/DC converter control unit 27; and an AC/DC changeover unit 9 which supplies direct current from the battery 2 to the constant voltage generation circuit 28 and supplies output from the AC/DC converter 8 to the constant voltage generation circuit 28 when the commercial AC power source is connected to the drive apparatus.

BRIEF DESCRIPTION OF THE DRAWINGS

FIG. 7 is a chart showing voltage waveforms at different portions of the drive control circuit shown in FIG. 6;

FIGS. 8A to 8E are charts exemplifying current or voltage waveforms at different positions in the drive apparatus for a vibrating-type compressor of the present invention;

DESCRIPTION OF THE PREFERRED EMBODIMENTS

Figure 1:
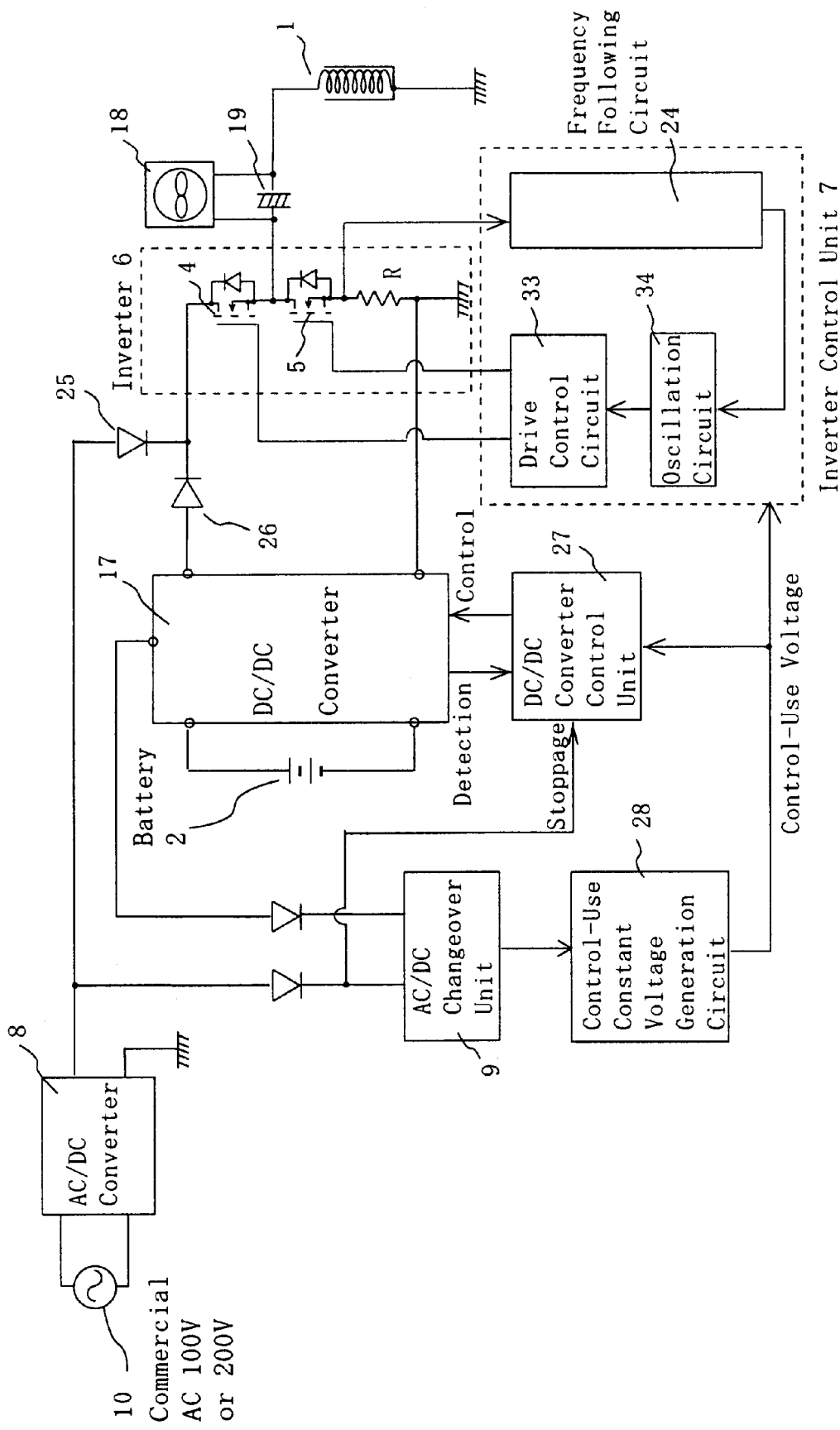
FIG. 1 is a general block diagram showing a drive apparatus for a vibrating-type compressor to which the present invention is applied.

FIG. 1 is a general block diagram showing a drive apparatus for a vibrating-type compressor to which the present invention is applied. In FIG. 1, reference numeral 2 denotes a battery; 17 denotes a DC/DC converter; 10 denotes a commercial AC power source; 8 denotes an AC/DC converter; 6 denotes an inverter; and 7 denotes a control unit for the inverter 6 adapted to control the frequency of electrical power supplied to a vibrating-type compressor 1.

The vibrating-type compressor 1 drives a refrigerator mounted on, for example, a vehicle, or a freezer in the case in which a container itself serves as a freezer. The vibrating-type compressor 1 operates upon receipt of AC power of a low voltage. Such a vibrating-type compressor 1 receives electrical power from the battery 2 mounted on the vehicle when the vehicle is operated, and from the commercial AC power source 10 when the vehicle is not operated. The changeover between the battery 2 and the commercial AC power source 10; i.e., changeover between AC and DC, is effected without use of a mechanical changeover unit. A diode OR circuit (Schottky diodes 25 and 26) provides such a changeover function. When the commercial AC power source 10 is connected to the terminal of the drive apparatus, after the vehicle has arrived at a parking area or other place, in the state in which electricity is supplied from the battery 2 via the DC/DC converter 17 and the diode 26, DC voltage output from the AC/DC converter 8 is supplied to the inverter 6 via the diode 25. At this time, as will be described in detail hereinbelow, supply of DC voltage from the battery 2 to the inverter 6 via the DC/DC converter 17 is stopped through control of a DC/DC converter control unit 27. The above-described configuration eliminates mechanical contacts from the power system to thereby decrease failure rate; i.e., to improve reliability. Further, since the conversion of AC→DC→AC performed during AC input is simpler than the conventionally practiced conversion of AC→DC→DC→AC, the drive apparatus has an improved conversion efficiency and consumes less power. Reference numeral 9 denotes an AC/DC changeover unit which selects a power source for control.

The DC/DC converter 17 can be configured so as to supply a constant DC voltage to the inverter 6, whether a 12-V battery or a 24-V battery is used as the battery 2, to thereby supply a constant AC voltage to the vibrating-type compressor 1. Hereinafter, a description will be given of an exemplary case in which the battery voltage is either DC 12 V or DC 24V. However, the circuit can be easily modified in order to cope with an increase in the number of battery voltages; e.g., in order to cope with DC 32 V in addition to DC 12 V and DC 24V.

The output voltage of the AC/DC converter 8 is preferably set equal to the output voltage of the DC/DC converter 17 which is connected to the AC/DC converter 8 via the diode OR circuit; e.g., DC 39 V. The output voltage of the AC/DC converter 8 must be maintained constant even when different commercial power source voltages; e.g., AC 100 V and 200 V, are used. This can be enabled through control of maintaining the output voltage of the AC/DC converter 8 constant. Further, in consideration that the voltage of a commercial power source in a specific region is fixed to, for example, AC 100 V or 200 V, an AC/DC converter having specifications suitable for the region may be used in order to output a constant voltage.

Figure 15:
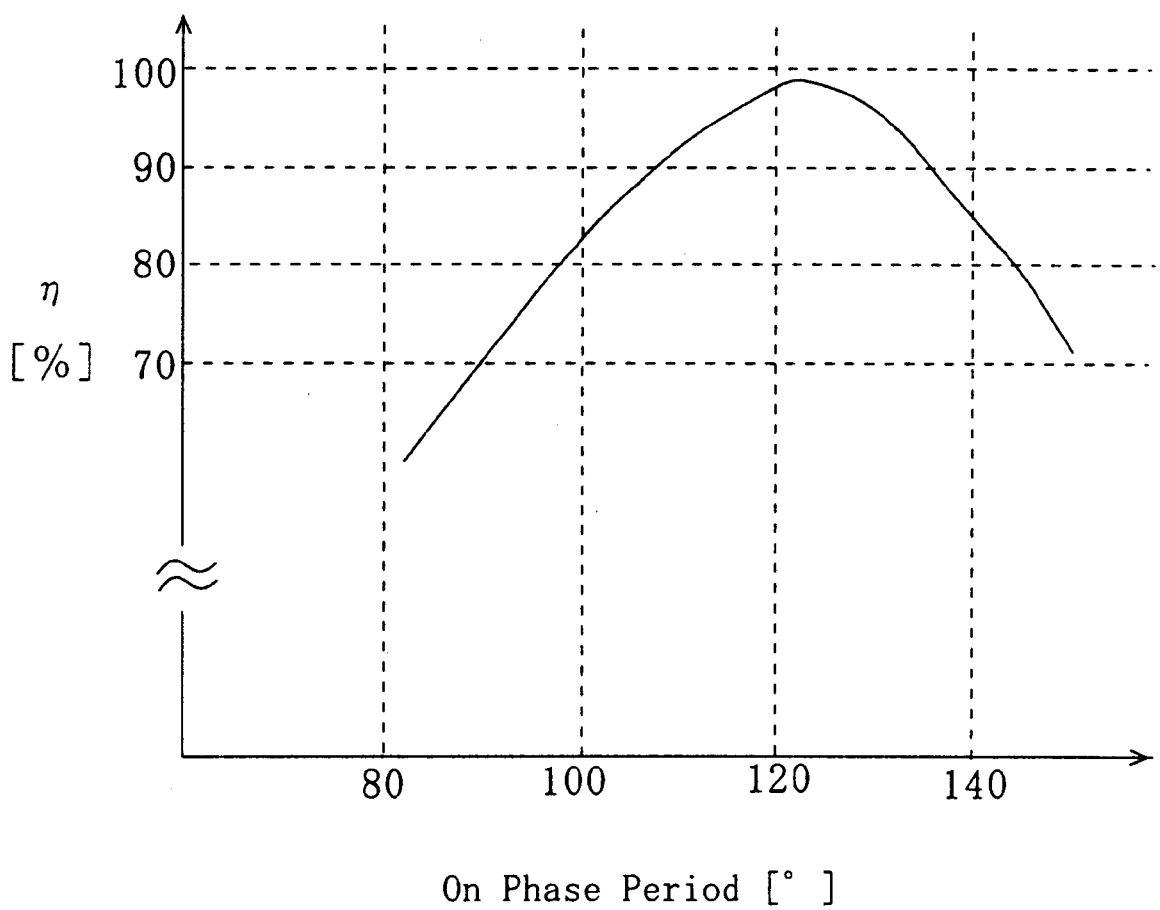
FIG. 15 is a graph showing the experimentally-obtained relationship between on period and efficiency of the vibrating-type compressor.

As will be described in detail, the inverter control unit 7 receives a constant DC voltage (e.g., 12 V) from a control-use constant voltage generation circuit 28, except in cases in which the battery or commercial power source enters an anomalous state. The inverter control unit 7 changes the frequency of pulses output from a serial circuit composed of first and second FETs 4 and 5 to thereby control the frequency of voltage applied from the inverter 6 to the vibrating-type compressor 1. At this time, the FETs 4 and 5 disposed in the upper and lower arms of the inverter 6 are turned on alternately such that each FET is in an on state over a 120° phase angle. By means of capacitance coupling, the vibrating-type compressor 1 is supplied with an AC voltage having a waveform which includes a 30° dead time, a 120° positive period, a 60° dead time, a 120° positive period, and a 30° dead time in each cycle. Since the waveform is closer to a sinusoidal waveform than is the conventional 180° alternating supply of electricity, the operation efficiency of the vibrating-type compressor 1 itself can be increased. FIG. 15 is a graph showing the experimentally-obtained relationship between on period and efficiency of the vibrating-type compressor. As is understood from FIG. 15, the efficiency becomes maximum in the vicinity of 120° (phase angle period during which the vibrating-type compressor 1 is on). As is also understood from FIG. 15, within the range of 100° to 140° (phase angle period), the efficiency is higher than 80%, which is satisfactory.

Further, through an operation of detecting the ambient temperature of the vibrating-type compressor 1 and changing the on period slightly, the efficiency can be increased further, and a valve-hitting phenomenon peculiar to vibrating-type compressors can be prevented.

The output of the inverter 6 is supplied to the vibrating-type compressor 1 via a capacitor 19. At this time, a substantially constant, low DC voltage can be generated across the capacitor in order to drive a DC fan motor 18 for cooling the radiator of the refrigerator or freezer. One end of the vibrating-type compressor 1 is grounded.

Next, the respective circuits of the drive apparatus for a vibrating-type compressor according to the present invention will be described in further detail.

Figure 2:
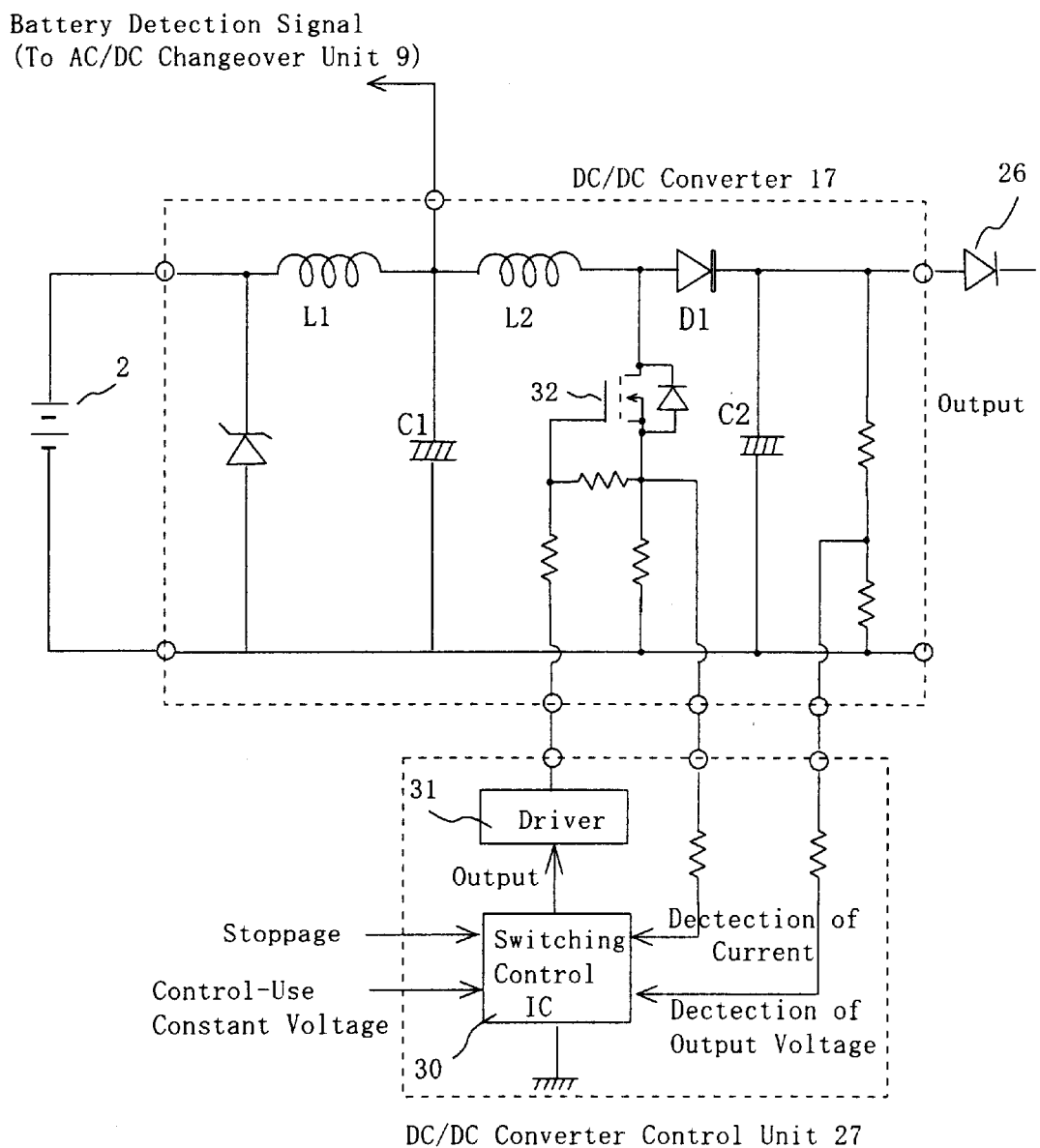
FIG. 2 is a diagram showing in detail the DC/DC converter and the DC/DC converter control unit shown in FIG. 1.

FIG. 2 is a diagram showing in detail exemplary configurations of the DC/DC converter 17 and the DC/DC converter control unit 27 shown in FIG. 1. The DC/DC converter 17 operates to generate a constant DC voltage, such as DC 39 V or 48 V, whether the voltage of the connected battery 2 is 12 V or 24 V. When an FET 32 is turned on, energy output from the battery 2 is accumulated within an inductance coil L2, and when the FET 32 is turned off, a voltage equal to the sum of the terminal voltage of a capacitor C1 and the voltage across the inductance coil L2 is supplied to the capacitor C2. The voltage of the capacitor C2 is supplied to the inverter 6 in the next stage. An inductance L1 is provided to secure stable operation of the DC/DC converter 17 even when surge voltage propagates from a the battery 2 side.

The FET 32 is controlled by the DC/DC converter control unit 27 shown in FIG. 2. The control unit 27 operates while receiving a constant voltage (12 V) from the control-use constant voltage generation circuit 28, which will be described later. A switching control IC 30 provided in the control unit 27 receives, as feedback, signals indicating the detected output voltage and current of the DC/DC converter 17. The switching control IC 30 outputs pulses to the FET 32 as a gate signal via a driver 31, and controls the duty ratio of the pulses depending on the signals indicating the detected output voltage and current. In this manner, the control unit 27 maintains the constant output voltage of the DC/DC converter 17. A stop signal applied to the switching control IC 30 is used in order to stop the operation of the DC/DC converter 17 when the commercial AC power source 10 is connected to the drive apparatus, as will be described later.

Figure 3:
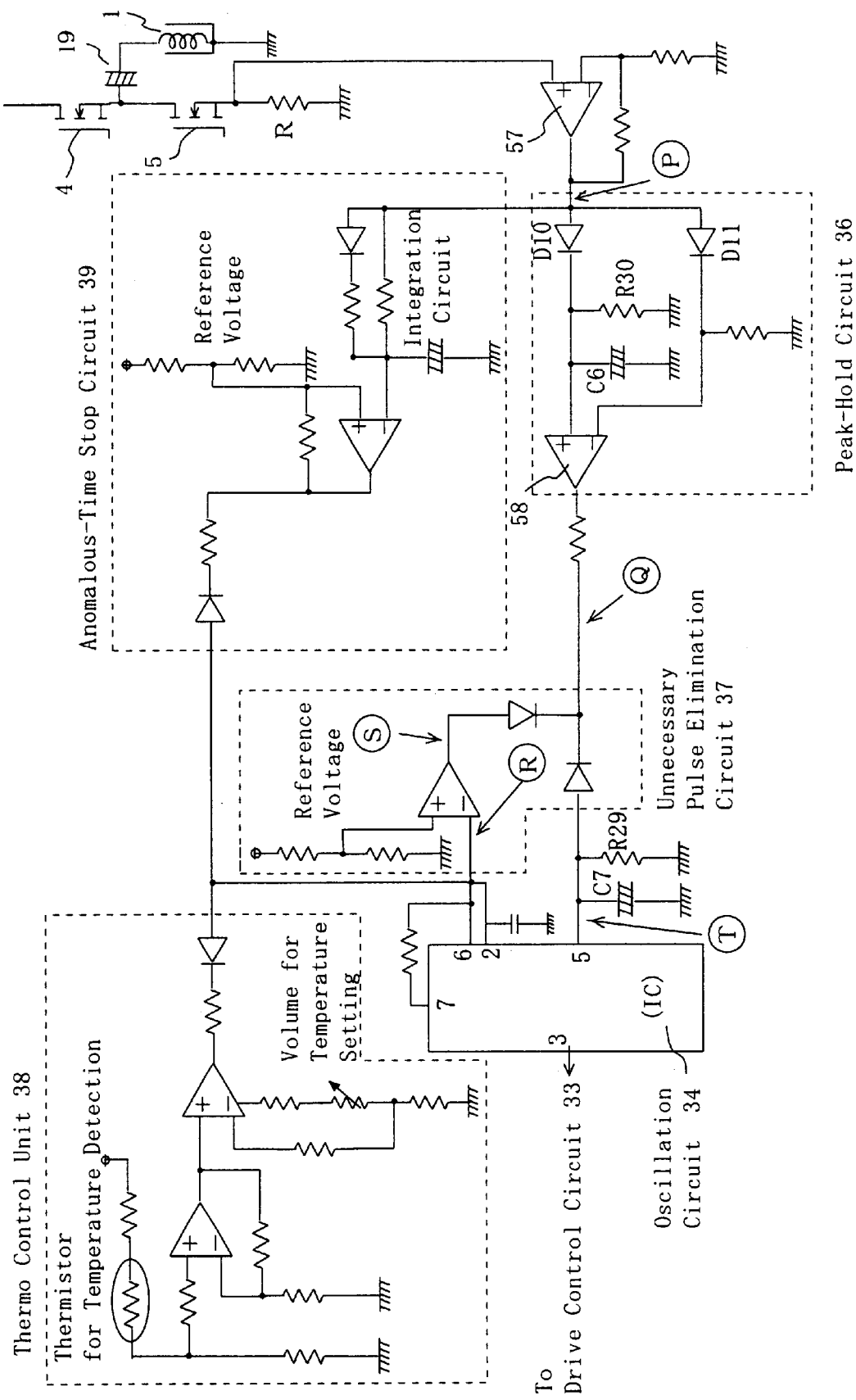
FIG. 3 is a circuit diagram showing in detail the frequency following circuit shown in FIG. 1.

FIG. 3 is a circuit diagram showing in detail the frequency following circuit 24 shown in FIG. 1. On the basis of detected inverter current, the frequency following circuit 24 controls an oscillation circuit 34 to thereby control the inverter 6 via a drive control circuit 33 such that the frequency of the AC voltage supplied to the vibrating-type compressor 1 follows the mechanical resonance frequency of the vibrating-type compressor 1.

Figure 4:
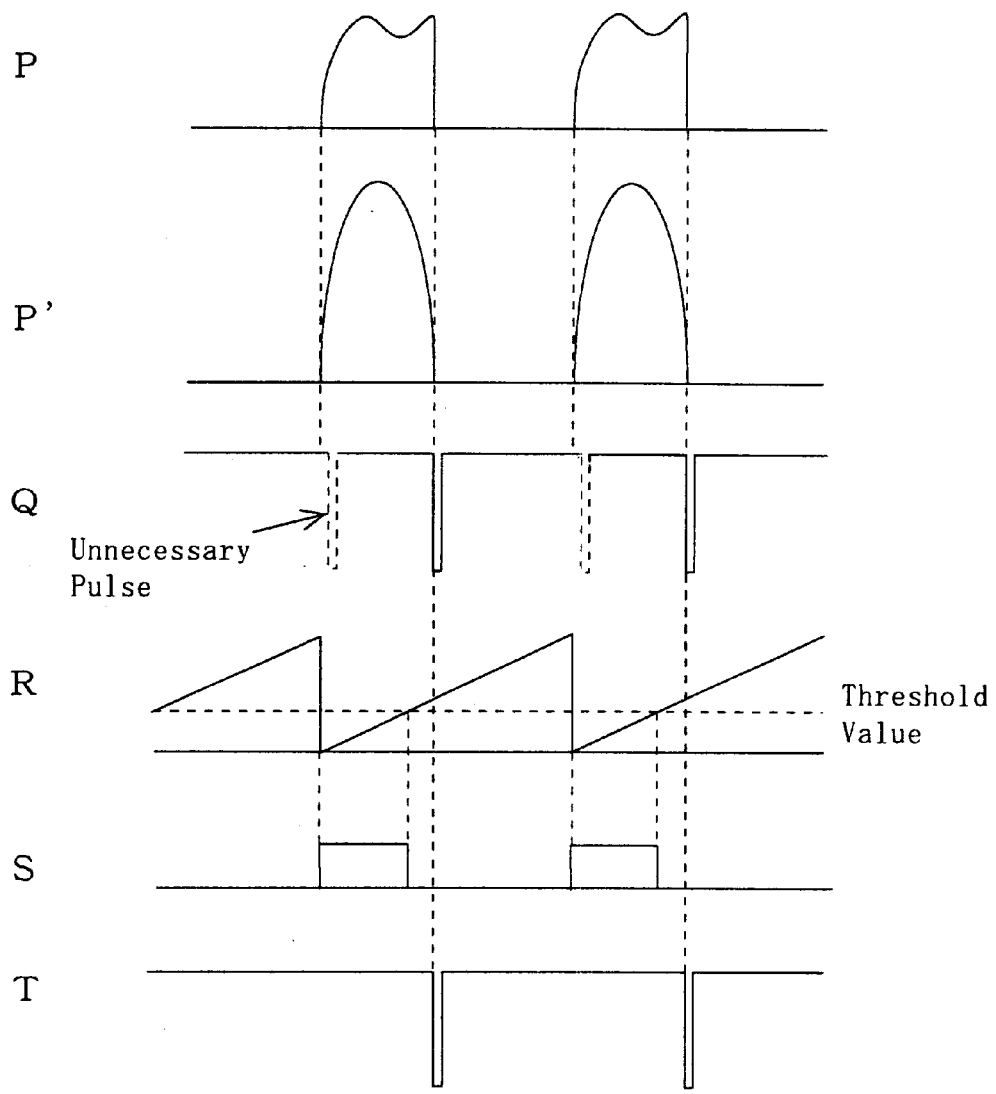
FIG. 4 is a chart showing voltage waveforms at different portions of the frequency following circuit shown in FIG. 3.

An instantaneous value of current flowing through the inverter 6 is detected as a voltage signal by means of a resistor R connected in series with the FET 5 of the inverter 6. This resistor R may be connected in series with the FET 4 in order to detect current flowing through the FET 4. However, when, as shown in FIG. 3, the detection circuit is configured to detect current flowing through the FET 5 disposed in the lower arm of the drive inverter for the vibrating-type compressor 1, one end of the detection resistor R can be grounded, thereby enabling use of an ordinary amplifier in a subsequent stage in place of a differential amplifier. Thus, stability and accuracy can be improved. The voltage signal indicative of the detected current is input to an amplifier 57. From the output of the amplifier 57 is obtained a waveform indicting an instantaneous voltage corresponding to the instantaneous value of current flowing through the FET 5 of the inverter 6 (see P in FIG. 4).

Figure 5:
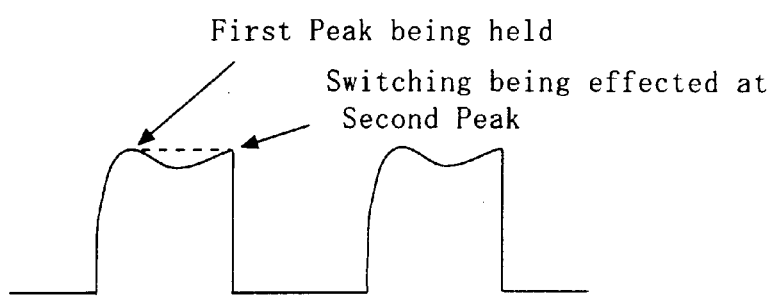
FIG. 5 is a chart used for description of a manner of detecting a second peak of current flowing through one FET of the inverter.

The instantaneous voltage is fed to a peak-hold circuit 36. As shown in FIG. 5, a first peak value of the voltage input via a diode D10 is held in a capacitor C6 with a certain time constant, and the thus-held first peak voltage is applied to a non-inverting terminal of a differential amplifier 58. A resistor 30 for adjusting the time constant is connected to the non-inverting terminal. When, as shown in FIG. 5, a second peak of the instantaneous voltage input to an inverting terminal of the differential amplifier 58 exceeds the peak value held in the capacitor C6, the differential amplifier 58 generates an output (see Q in FIG. 4). The output is input to the oscillation circuit 34 as a control voltage (see T in FIG. 4). A resistor R29 and a capacitor C7 are provided in order to adjust the time constant to thereby adjust the width of output pulses.

The oscillation circuit 34 can variably control the oscillation frequency in accordance with the timing of a signal being output from the differential amplifier 58. The pulses output from the oscillation circuit 34 and having a controlled frequency are input to the drive control circuit 33 to thereby control the inverter 6 to operate at a frequency which follows the mechanical resonance frequency of the vibrating-type compressor 1, as will be described with reference to FIG. 6.

An unnecessary pulse elimination circuit 37 is provided to reliably prevent an unnecessary narrow pulse (see Q in FIG. 4) from appearing in the output of the differential amplifier 58, which narrow pulse would otherwise be generated in the vicinity of the first peak and would cause an erroneous operation. Specifically, a threshold is set for a reference triangular wave (see R in FIG. 4) output from pins 2 and 6 of the oscillation circuit (IC) 34; and during a period in which the level of the reference triangular wave is lower than the threshold; i.e., a period in which an unnecessary pulse may be generated (see S in FIG. 4), voltage is forcedly applied to the output of the differential amplifier 58 to thereby mask the unnecessary pulse.

Further, an anomalous-time stop circuit 39 is provided in order to protect the inverter when the vibrating-type compressor 1 enters an anomalous state. When the vibrating-type compressor 1 enters an anomalous state and is locked, the detected inverter current assumes a waveform which is similar to that obtained through half-wave rectification and which has a large magnitude (see P' in FIG. 4). Therefore, by use of an integration circuit, the anomalous-time stop circuit 39 detects current exceeding a threshold value, and upon detection of such current, the anomalous-time stop circuit 39 absorbs the reference triangular wave output from the pins 2 and 6 of the oscillation circuit (IC) 34 in order to stop the operation of the oscillation circuit (IC) 34, to thereby protect the inverter.

The circuit illustrated in FIG. 3 has a thermo-control unit 38. The thermo-control unit 38 compares a refrigerator internal temperature which a user has set by use of a temperature setting volume and an evaporator temperature which a temperature detection thermistor detects. On the basis of the results of comparison, the thermo-control unit 38 stops the oscillation circuit (IC) 34, by absorbing the reference triangular wave output from the pins 2 and 6 of the oscillation circuit (IC) 34, and resumes the operation of the oscillation circuit (IC) 34 by permitting the oscillation of the reference triangular wave.

Figure 6:
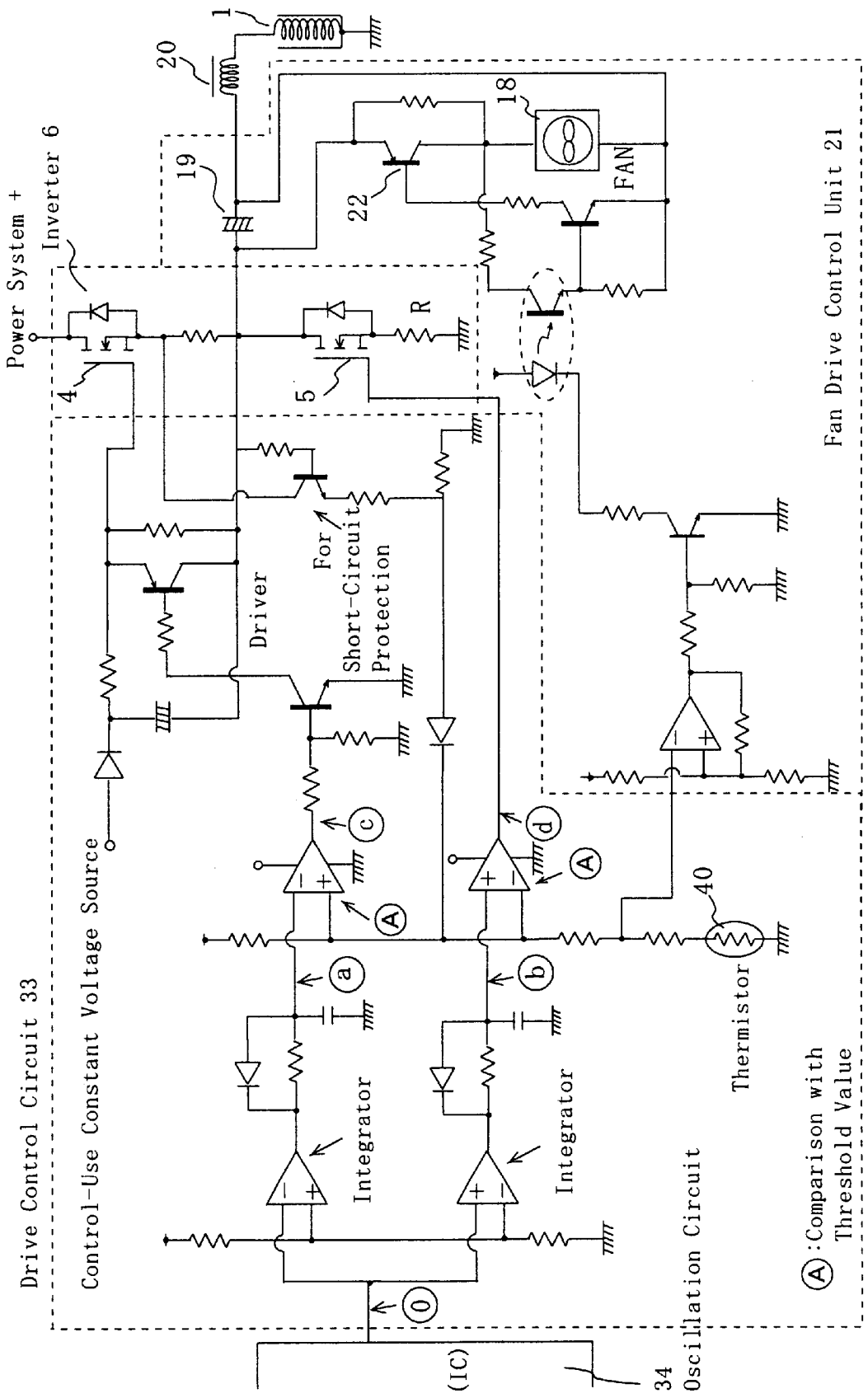
FIG. 6 is a circuit diagram showing the details of a drive control circuit which constitutes the inverter control unit shown in FIG. 1.

FIG. 6 is a circuit diagram showing the details of a drive control circuit 33 which constitutes the inverter control unit 7 shown in FIG. 1. As have been described with reference to FIG. 3, the output of the oscillation circuit (IC) 34 assumes a rectangular wave of a controlled frequency (see O in FIG. 7). The drive control circuit 33 realizes a 120° drive by use of such a rectangular wave. Specifically, the drive control circuit 33 includes a circuit for the upper arm for driving the FET 4 of the inverter 6, and a circuit for the lower arm for driving the FET 5 of the inverter 6. In the circuit for the upper arm, the rectangular wave output from the oscillation circuit (IC) 34 is integrated by means of an integrator, so that a sawtooth wave as shown in section a of FIG. 7 is obtained. This sawtooth wave is compared with a threshold value in order to obtain a pulse having a delay of 60° with respect to the leading edge of a corresponding on pulse, as shown in section c of FIG. 7. The thus-obtained pulse is supplied to the FET 4 of the inverter 6 via a driver. Similarly, in the circuit for the lower arm, the rectangular wave output from oscillation circuit (IC) 34 is integrated by means of an integrator, so that a sawtooth wave as shown in section b of FIG. 7 is obtained. This sawtooth wave is compared with a threshold value in order to obtain a pulse which is delayed from the leading edge of a corresponding on pulse such that a phase difference of 180° is produced relative to the above-mentioned pulse c. The thus-obtained pulse is supplied to the FET 5 of the inverter 6. In this manner, a 120° drive is realized. Further, the threshold values used in the above-mentioned comparison are slightly changed depending on the ambient temperature of the vibrating-type compressor 1, which is detected by use of a thermistor 40. This prevents a valve hitting phenomenon which would otherwise occur in the vibrating-type compressor at low temperature, and increases the output at high temperature. Further, as shown in FIG. 6, a short-circuit protection transistor may be provided in order to protect the inverter by stopping the FET 4 in the upper arm of the inverter 6 when the inverter output is short-circuited.

In a state in which a positive voltage of, for example, 45 V, is applied from the power system to the inverter 6, the voltage produced across the FET 5 (i.e., the output of the inverter 6) becomes 45 V when the FET 4 is on and the FET 5 is off, and becomes 0 V when the FET 4 is off and the FET 5 is on. Since the DC component of the output of the inverter 6 is cut by the serially connected capacitor 19, an AC voltage whose potential changes between +22 V and −22 V (see FIG. 8A) is applied between the opposite terminals of the vibrating-type compressor 1 via a reactance coil 20 for smoothing. FIG. 8B shows a voltage produced between the opposite terminals of the capacitor 19. As is apparatus from FIG. 8B, the voltage produced across the capacitor 19 is a substantially constant DC voltage, although it contains a slight pulsating component. When a DC fan motor is connected between the opposite terminals of the capacitor, the substantially constant DC voltage can be applied to the fan motor regardless of variation in the battery voltage.

A fan drive control unit 21 shown in FIG. 6 is configured such that when the ambient temperature detected by the thermistor 40 exceeds a preset temperature, the fan rotates in order to effect cooling. Since electric power is supplied to the fan only when needed, energy can be conserved. Further, a transistor 22 is inserted in series between the capacitor 19 and the fan 18. When the electric circuit of the fan 18 is short-circuited, the transistor 22 detects this and breaks the circuit. This configuration enables stopping of the drive of the fan 18 at the time of short circuit having occurred, without affecting the control of the vibrating-type compressor 1.

FIG. 8C shows the current flowing through the FET 4, and FIG. 8D shows the current flowing through the FET 5. The compressor current shown in FIG. 8D is obtained through addition of the current shown in FIG. 8C and the current shown in FIG. 8E, with the direction of the current shown in FIG. 8E being inverted.

As described above, the drive control circuit 33 shown in FIG. 6 receives pulses output from the oscillation circuit 34 controlled by the above-described frequency following circuit 24 and drives the FETs 4 and 5. The output pulses have a frequency which is controlled to follow the mechanical resonance frequency of the vibrating-type compressor 1. Since the drive control circuit 33 receives a DC voltage (DC 12 V) from the control-use constant voltage generation circuit 28, the detailed configuration of which will be described later, when the battery voltage drops, the supply of DC voltage to the drive control circuit 33 is stopped, so that the FETs 4 and 5 of the inverter do not operate in such a state. Further, as shown in the drawings, one end of the vibrating-type compressor 1 can be connected directly to the ground side of the battery 2 without the interposition of any element. This enables grounding of one end of the vibrating-type compressor 1.

Figure 9:
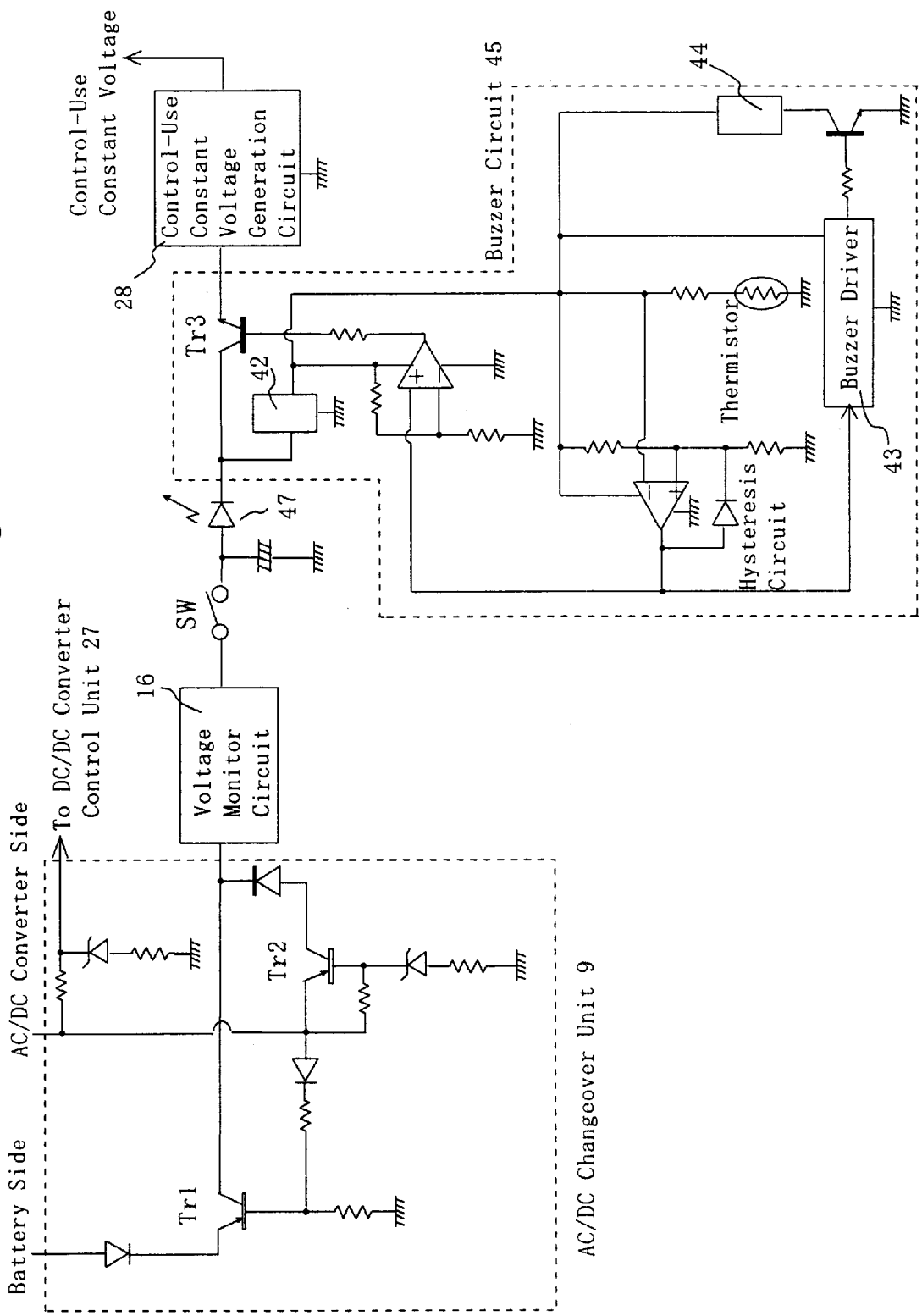
FIG. 9 is a diagram showing the details of a contactless AC/DC changeover unit and a first example of a circuit provided for a control power supply.

FIG. 9 is a diagram showing the details of a contactless AC/DC changeover unit 9 and a first example of a circuit provided for a control power supply. When the drive apparatus is connected to a commercial AC power source in a state in which the vibrating-type compressor 1 for a refrigerator is operated with a battery being used as a power source, the drive apparatus is operated by use of the control AC power source without the battery being disconnected.

For battery operation, the drive apparatus is designed to accept a wide range of input voltage, in consideration of use in cars, trucks, buses, and watercraft, and has specifications which enable not only operation in a 12 V system and a 24 V system, but operation over a range of 10 V to 32 V. For AC operation, the drive apparatus is equipped with a selected AC/DC converter for, for example, 100 V (110V) input or 200 V (240 V) input; i.e., an AC/DC converter having specifications suitable for a region in which the drive apparatus is used. Although these two power systems are connected together by means of a diode OR circuit composed of Schottky diodes, the control systems for these power systems must be changed over simultaneously with changeover between the two power systems.

When the battery 2 is connected to the drive apparatus, the voltage from the battery 2 turns on a transistor Tr1 shown in FIG. 9, so that the battery voltage is supplied to a voltage monitor circuit 16. When a commercial AC power source is connected to the drive apparatus in this state, a transistor Tr2 (FIG. 9) is turned on by means of voltage from the AC/DC converter 8 (FIG. 1), and stops the base current of the transistor Tr1 in order to turn off the transistor Tr1. Thus, the battery-side power supply is shut off. At the same time, at the time of AC input, a voltage signal is fed to the switching control IC 30 of the DC/DC converter control unit 27 (FIG. 2) in order to stop the DC/DC converter 7, whereby the battery is disconnected from the power system. Therefore, the diode OR circuit for the power systems does not provide an OR function in the state in which both the power systems output power, but provides a contactless switch function.

As will be described with reference to FIG. 10, the voltage monitor circuit 16 detects a voltage of a power source connected. When the detected voltage is proper, the voltage monitor circuit 16 outputs a constant voltage (12 V) and supplies it to the DC/DC converter control unit 27 and the inverter control unit 7. When the battery voltage or the output voltage of the AC/DC converter drops to a level lower than a reference value, the voltage monitor circuit 16 detects such a voltage drop and turns off the output.

The output voltage of the voltage monitor circuit 16 is supplied to the control-use constant voltage generation circuit 28 via a switch SW for turning on and off the refrigerator or freezer, a light-emitting diode 47 for displaying the operation state, and a buzzer circuit 45. In the conventional apparatus, the power supply line is branched, and a current limiting resistor is inserted into the branch path in order to detect a "voltage," thereby displaying the operation state. However, this conventional scheme lowers the overall efficiency by an amount corresponding to the amount of current flowing through the light-emitting diode. By contrast, in the circuit shown in FIG. 9, since the light-emitting diode for displaying the on state is inserted directly into the main current path, the overall efficiency of the circuit does not decrease.

The buzzer circuit 45 detects the temperature in the vicinity of the condenser of the refrigerator by use of the illustrated thermistor. When the detected temperature exceeds a preset temperature, the buzzer circuit 45 automatically shuts off the power supply of the refrigerator and operates a buzzer 44 via a buzzer driver 43, and maintains this state until the user turns off the power switch SW. In particular, in the case of a built-in-type refrigerator to be fitted into a depressed portion of a wall of a watercraft or land vehicle, since flow of air is limited and heat radiation efficiency decreases, failure of the refrigerator itself must be prevented.

The buzzer circuit 45 imparts a relatively large hysteresis to a threshold value when the buzzer circuit 45 detects the temperature. Further, upon detection of a high temperature, the buzzer circuit 45 operates the buzzer 44 and automatically stops the refrigerator in order to prevent discharge of the battery. The buzzer circuit 45 achieves this action by turning off a transistor Tr3 and thus stopping the supply of voltage to the control-use constant voltage generation circuit 28. Since the electrical power for the buzzer circuit 45 is supplied from a constant voltage circuit 42 disposed in a stage preceding the transistor Tr3, the operation of the buzzer continues until the user turns off the switch SW.

The control-use constant voltage generation circuit 28 may be constituted by a three-terminal regulator and operate so as to generate a constant voltage of 12 V, so long as the output voltage of the voltage monitor circuit 16 is applied thereto, and regardless of whether the applied voltage is 12 V or 24 V.

Figure 10:
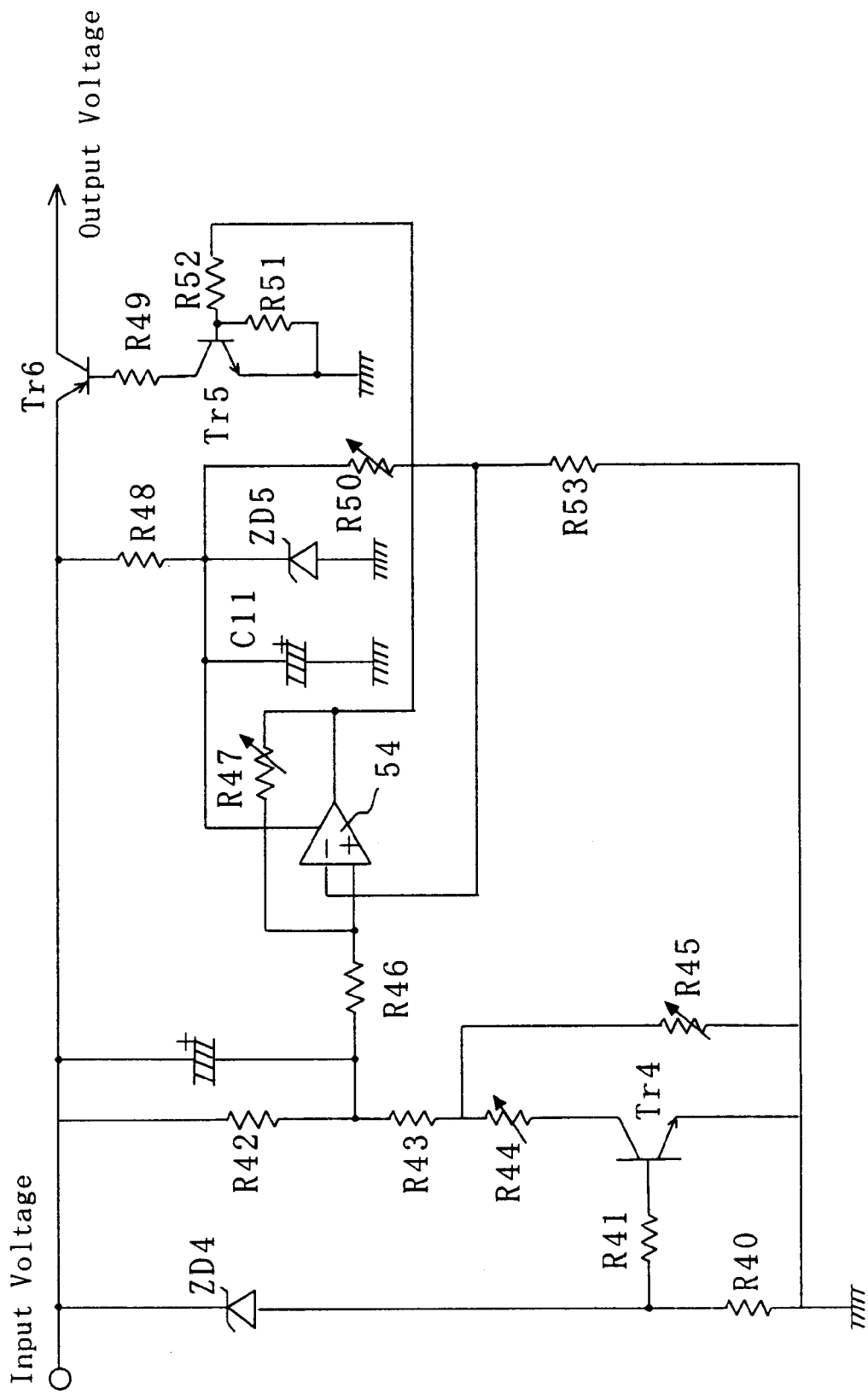
FIG. 10 is a diagram showing the details of the voltage motor circuit shown in FIG. 9.

FIG. 10 is a diagram showing the details of the voltage motor circuit 16. The following description is based on the assumption that either 12 V or 24 V is supplied from the battery or the AC/DC converter. A transistor Tr4 judges whether the output of the battery or the AC/DC converter is 12 V or 24 V. The circuit constants of a circuit including the transistor Tr4 are determined such that when the input voltage applied from the battery is greater than 18 V (a threshold value corresponding to the center value between 12 V and 24 V), a zener diode ZD4 comes into a conductive state to thereby turn on the transistor Tr4. In other words, the voltage type of the battery (or the commercial power source) is judged through the above-described operation.

First, a case in which a 12-V battery is connected to the drive apparatus will be considered. Since the transistor Tr4 maintains its off state as described above, a voltage (e.g., 5 V) obtained through proportional division of the input voltage 12 V at a ratio of R42:(R43+R45) is applied to a non-inverting terminal of an operational amplifier 54. At this time, a voltage (e.g., 5 V) obtained through proportional division of a constant voltage appearing across a zener diode ZD5 at a ratio of R50:R53 is applied to an inverting terminal of the operational amplifier 54. However, whereas the voltage applied to the inverting terminal of the operational amplifier 54 is maintained constant through the action of the zener diode ZD5, the voltage applied to the non-inverting terminal of the operational amplifier 54 varies in proportion to the battery voltage. Therefore, when the battery voltage is not greater than 12 V, the voltage applied to the non-inverting terminal of the operational amplifier 54 is lower than the constant voltage applied to the inverting terminal thereof, so that the operational amplifier 54 does not generate an output signal. When the battery voltage exceeds 12 V, the voltage applied to the non-inverting terminal of the operational amplifier 54 becomes higher than the constant voltage applied to the inverting terminal thereof, so that the operational amplifier 54 generates a positive output signal.

Further, the signal output from the operational amplifier 54 is fed back to the non-inverting terminal via a feedback resistor R47. Therefore, the operational amplifier 54 does not enter an off state immediately after the battery voltage decreases to a level below 12 V in a state in which the power supply is operated by the battery; i.e., the operational amplifier 54 generates the output signal properly. The circuit constants can be set such that the operational amplifier 54 enters an off state when the battery voltage becomes equal to or lower than, for example, 11 V, due to further voltage drop. When the battery voltage exceeds 18 V, the above-described circuit judges that a 24-V battery is connected to the drive apparatus as described above. In such a case, the operational amplifier 54 enters an off state, as will become apparent from the following description (the case of the battery voltage being not greater than 24 V).

Next, a case in which a 24-V battery is connected to the drive apparatus will be considered. Since the transistor Tr4 comes into an on state in this case, a voltage obtained through proportional division of the input voltage 24 V at a ratio of R42:(R43+R44·R45/(R44+R45) is applied to the non-inverting terminal of an operational amplifier 54. At this time, the same voltage as that applied during use of the 12 V system is applied to the inverting terminal of the operational amplifier 54 by the zener diode ZD5. Therefore, when the voltage which is proportional to the battery voltage and is applied to the non-inverting terminal is set to a voltage (e.g., 5 V) which is equal to that in the case of the above-described 12-V battery being connected, this circuit operates in the same manner as in the case of the 12 V system. That is, the circuit can be configured in such a manner that when the battery voltage exceeds 24 V, the operational amplifier 54 generates an output, and once the output is generated, the operational amplifier 54 maintains its on state unless the battery voltage becomes equal to or lower than 22 V.

When the operational amplifier 54 generates an output, the output turns on a transistor Tr5 and then turns on a transistor Tr6, to thereby output the battery voltage applied to the input terminal to a next stage as an output voltage.

As described above, in the assumed case in which a 12-V or 24-V power source is connected to the drive apparatus, the voltage type used is judged, and when the voltage becomes equal to or lower than, for example, 11 V or 22 V, an anomalous state is judged to have occurred, and the output is turned off. Otherwise, the battery voltage is judged to be proper, and the control-use constant voltage generation circuit 28 outputs a constant voltage of DC 12 V regardless of the voltage type used. Although the above description has been made on the assumption that 12-V and 24-V power sources are selectively connected to the drive apparatus, the drive apparatus can cope with a larger number of types of batteries and AC/DC converters through slight change of the circuit, and even when an arbitrary power source is connected to the drive circuit, the voltage monitor circuit 16 can detect a voltage drop corresponding to the power source.

Figure 11:
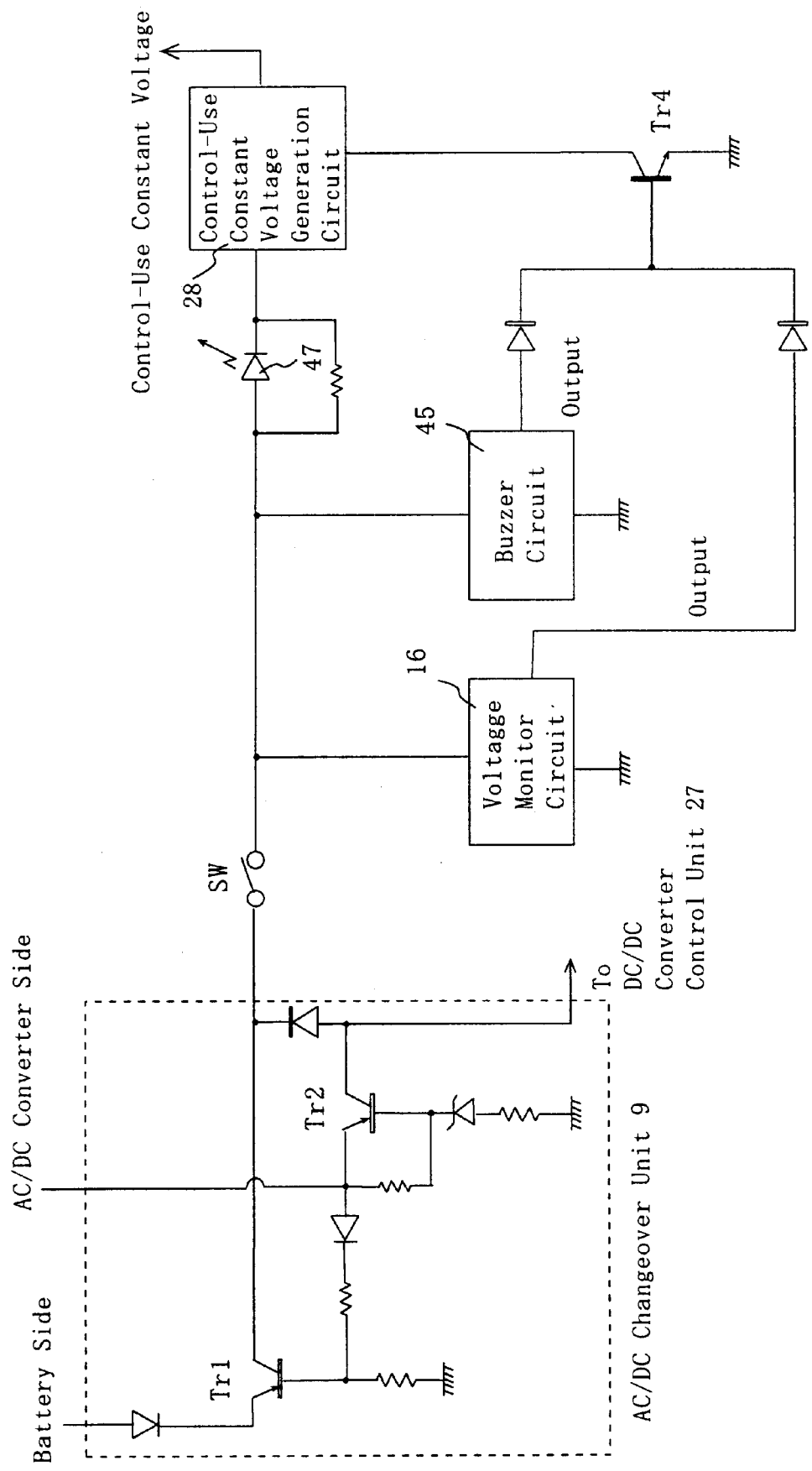
FIG. 11 is a diagram showing the details of the contactless AC/DC changeover unit and a second example of the circuit provided for the control power supply.

FIG. 11 is a diagram showing the details of the contactless AC/DC changeover unit 9 and a second example of a circuit provided for a control power supply. The AC/DC changeover unit 9 shown in FIG. 11 has basically the same configuration as that shown in FIG. 9, except that an output voltage from the transistor Tr2, which enters an on state upon reception of voltage from the AC/DC converter 8, is used as a signal which is sent to the DC/DC converter control unit 27 in order to stop the DC/DC converter at the time of AC input. This configuration reduces the number of components and consumed current.

Further, a shut-off circuit operating when the voltage monitor circuit 16 or the buzzer circuit 45 senses an anomalous state, is not provided in the. power supply line. The voltage monitor circuit 16 and the buzzer circuit 45 merely sense the voltage on the power supply line and control a transistor Tr4 connected to the ground side of the control-use constant voltage generation circuit 28, via a diode OR circuit disposed between the voltage monitor circuit 16 and the buzzer circuit 45 and the transistor Tr4. This configuration decreases the number of transistors inserted into the power supply line, so that the lowest operation voltage for battery use decreases, and the effective range of power supply voltage for battery input increases. Notably, as shown in FIG. 11, a shunt resistor may be connected in parallel to the light-emitting diode 47 for display purpose.

Figure 12:
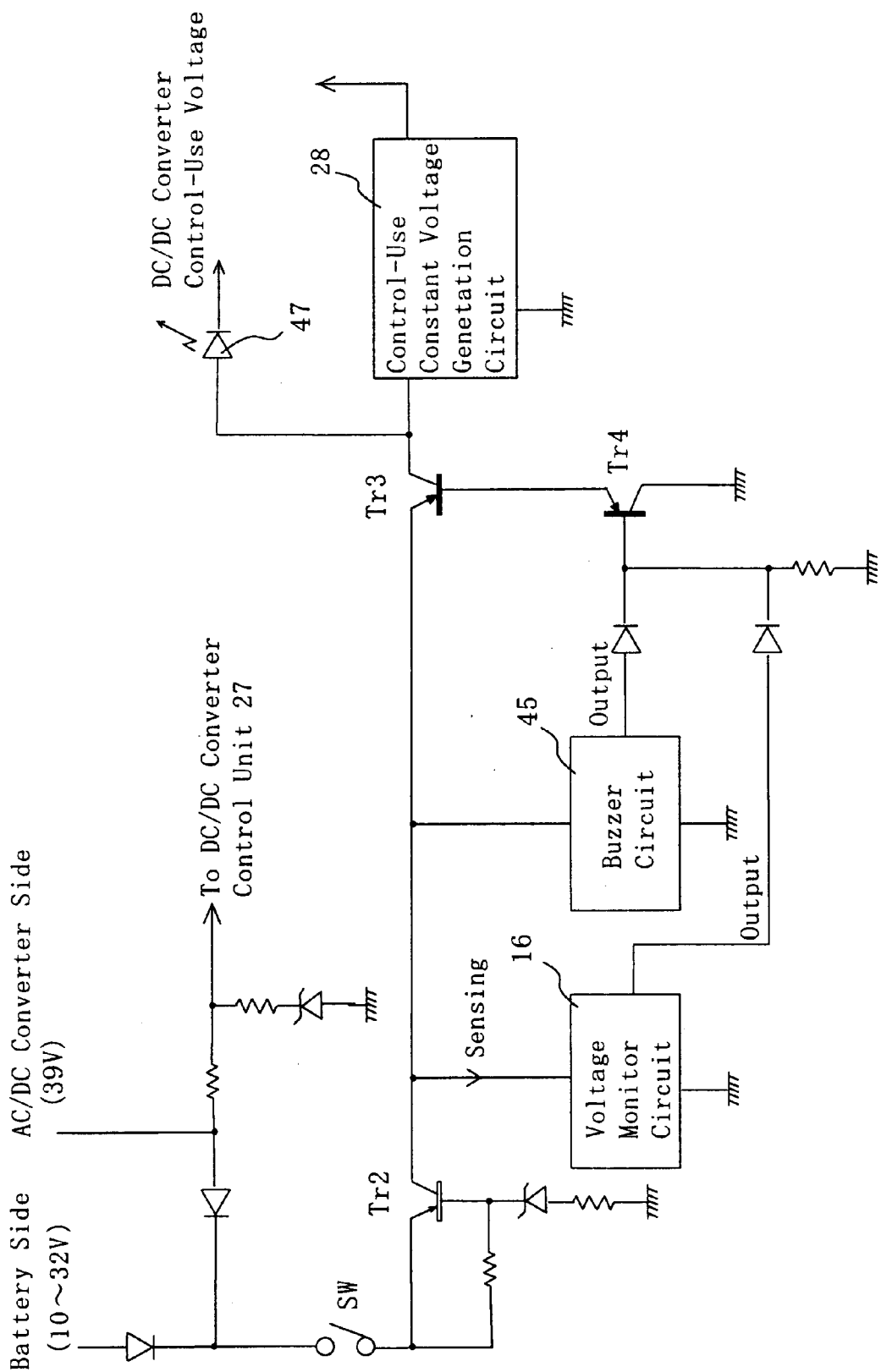
FIG. 12 is a diagram showing the details of the contactless AC/DC changeover unit and a third example of the circuit provided for the control power supply.

FIG. 12 is a diagram showing the details of the contactless AC/DC changeover unit 9 and a third example of a circuit provided for a control power supply. In the circuit shown in FIG. 12, the output voltage of the AC/DC converter used for AC input is set to a voltage; e.g., 39 V, which is outside the range of input battery voltage (10 V to 32 V); and the output voltage of the AC/DC converter and the battery voltage are received by a diode OR circuit. Further, a shut-off circuit operating when the voltage monitor circuit 16 or the buzzer circuit 45 senses an anomalous state, is not provided in the power supply line. The voltage monitor circuit 16 and the buzzer circuit 45 merely sense the voltage on the power supply line. The voltage monitor circuit 16 and the buzzer circuit 45 are connected to the transistor Tr4 via a diode OR circuit. The transistor Tr4 controls the transistor Tr3 disposed in the power supply line in order to shut off supply of power in the case of an anomalous state having occurred. This circuit arrangement simplifies the circuit configuration.

Figure 13:
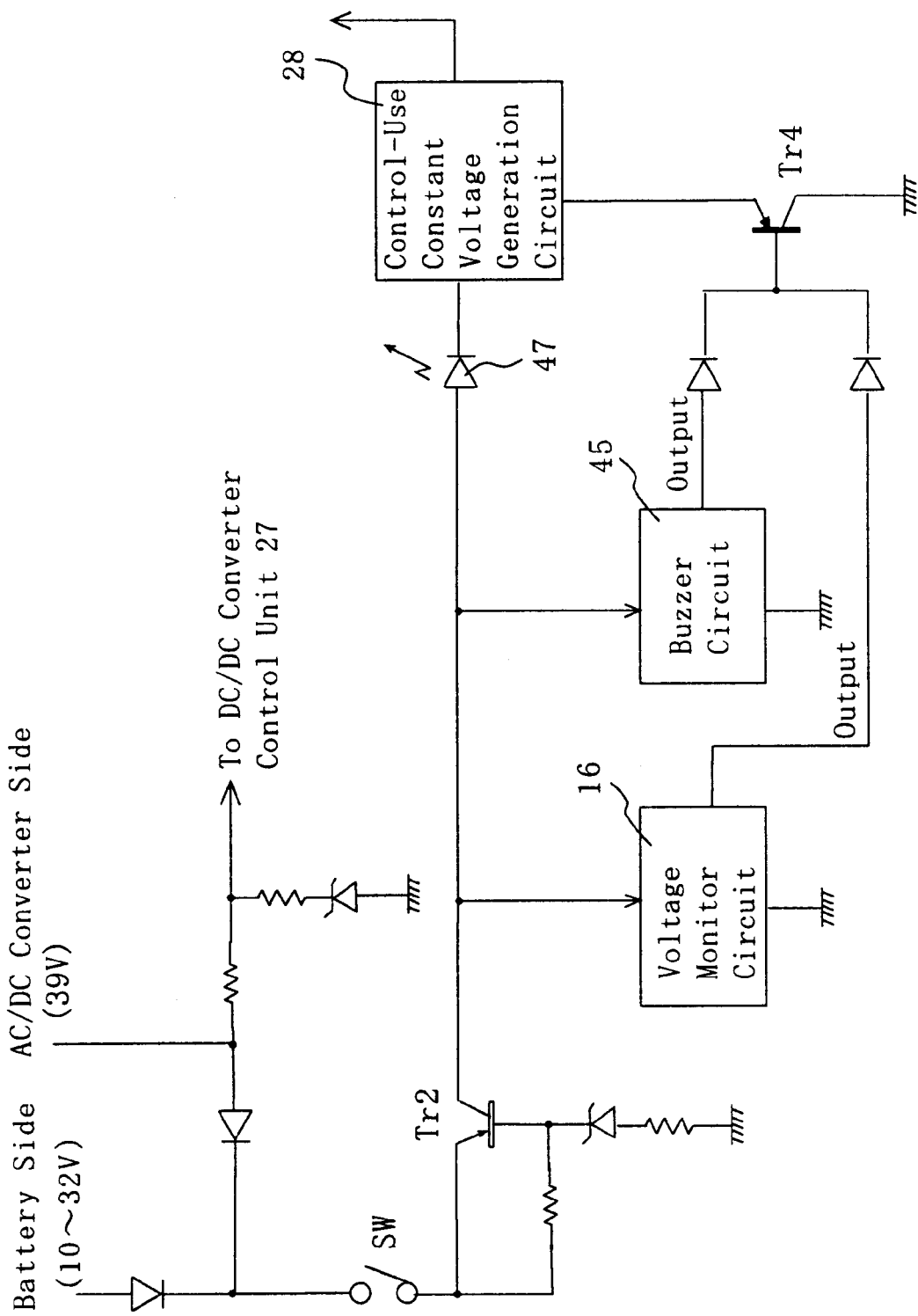
FIG. 13 is a diagram showing the details of the contactless AC/DC changeover unit and a fourth example of the circuit provided for the control power supply.
Figure 14:
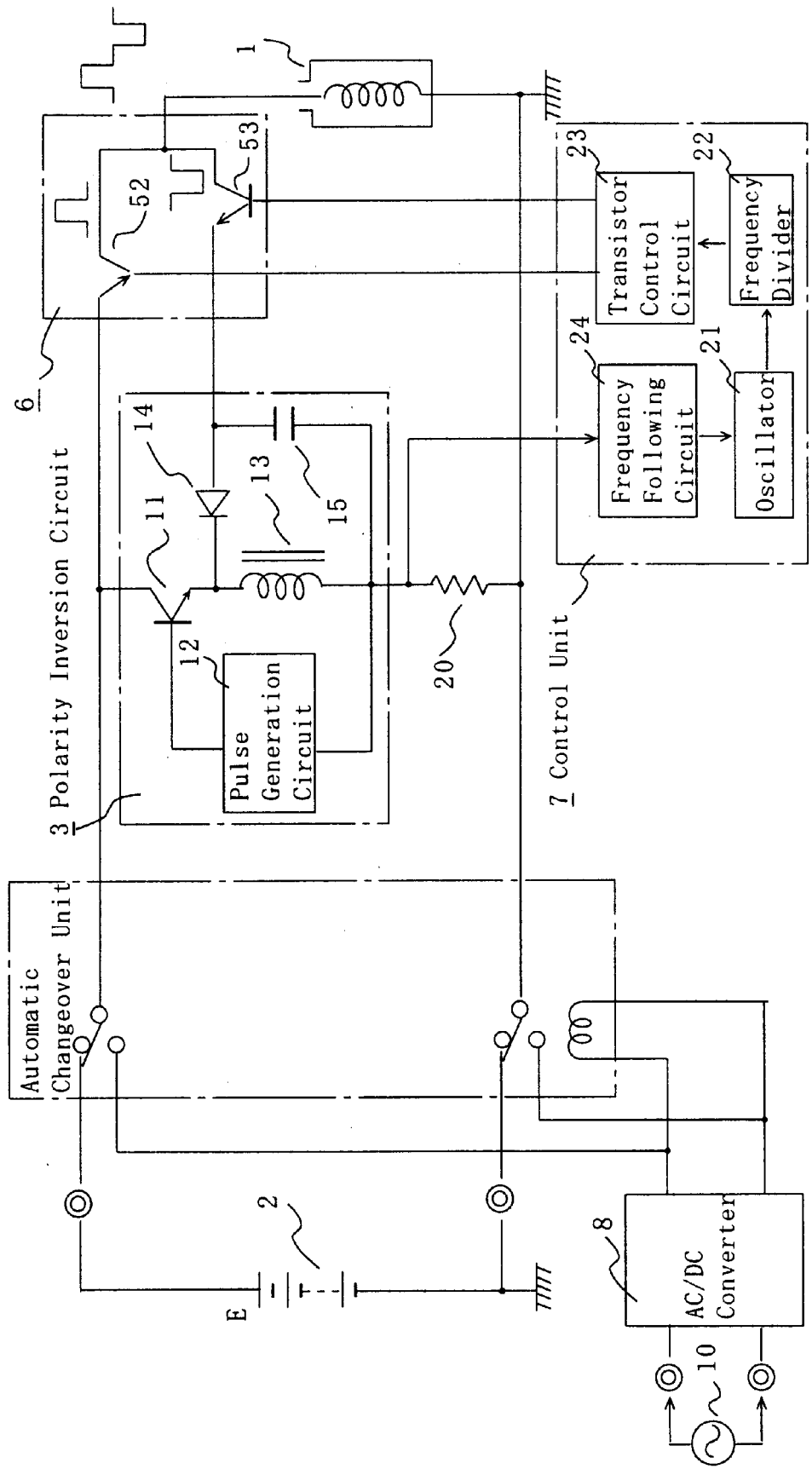
FIG. 14 is a general block diagram of a conventional drive apparatus for a vibrating-type compressor.

FIG. 13 is a diagram showing the details of the contactless AC/DC changeover unit 9 and a fourth example of a circuit provided for a control power supply. The circuit shown in FIG. 13 incorporates in combination the feature of the second example shown in FIG. 11 and the feature of the third example shown in FIG. 12. That is, similar to the third example, the output voltage of the AC/DC converter used for AC input is set to a voltage; e.g., 39 V, which is outside the range of input battery voltage (10 V to 32 V); and the output voltage of the AC/DC converter and the battery voltage are received by a diode OR circuit. Further, similar to the second example, a shut-off circuit operating when the voltage monitor circuit 16 or the buzzer circuit 45 senses an anomalous state, is not provided in the power supply line. The voltage monitor circuit 16 and the buzzer circuit 45 merely sense the voltage on the power supply line and control a transistor Tr4 connected to the ground side of the control-use constant voltage generation circuit 28, via a diode OR circuit disposed between the voltage monitor circuit 16 and the buzzer circuit 45, and the transistor Tr4.

Figure 16:
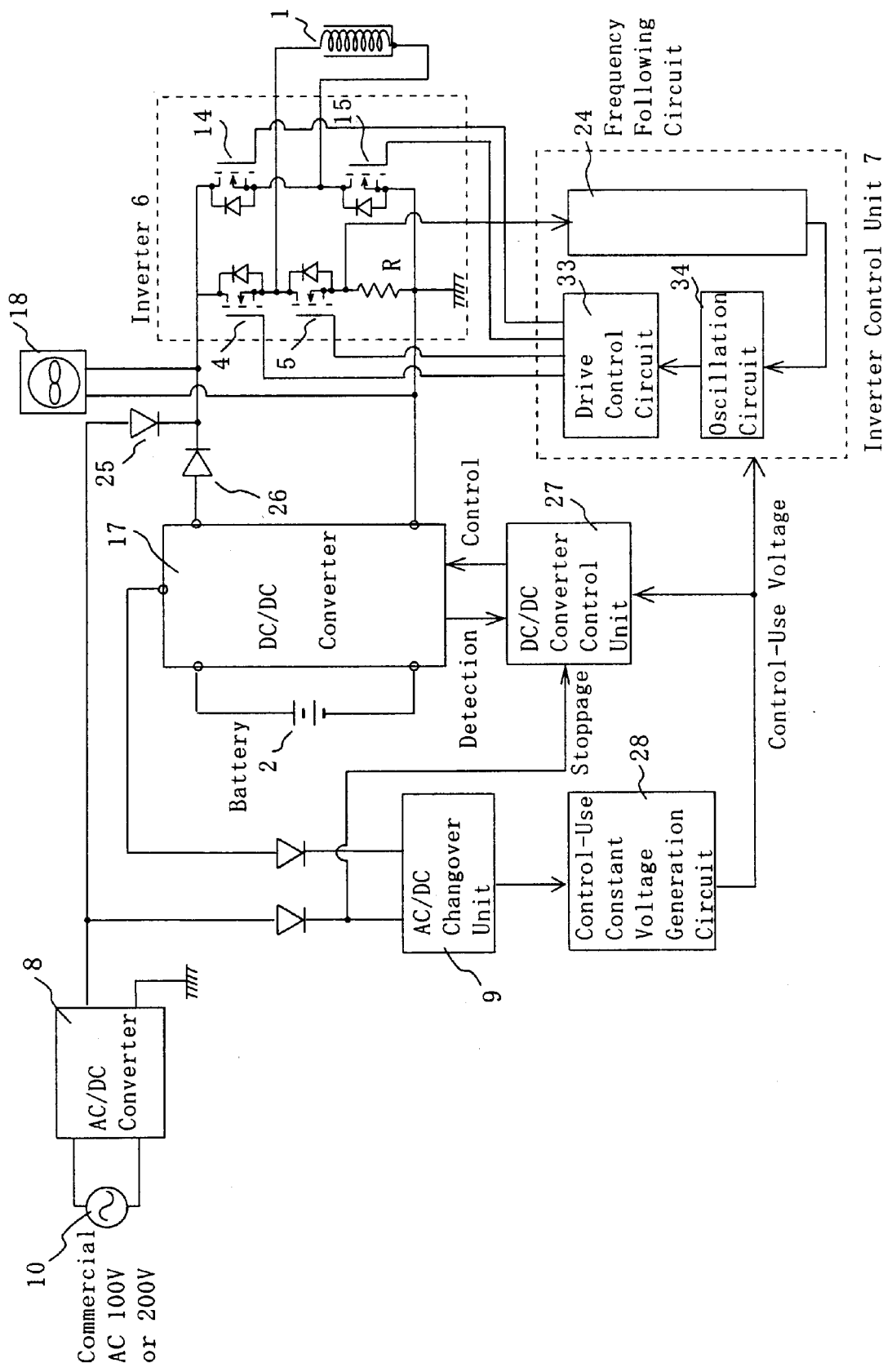
FIG. 16 is a general block diagram showing another drive apparatus for a vibrating-type compressor to which the present invention is applied.

FIG. 16 is a general block diagram showing another drive apparatus for a vibrating-type compressor to which the present invention is applied. The drive apparatus shown in FIG. 16 differs from the drive circuit shown in FIG. 1 in that the inverter 6 is constituted by a bridge-type inverter and that the circuit for driving the inverter 6 has a different configuration. Therefore, descriptions of the same circuits as those shown in FIG. 1 are omitted.

The inverter 6 comprises serially connected first and second FETs 4 and 5 and serially connected third and fourth FETs 14 and 15, which form a bridge circuit. The bridge-type inverter itself is well known. The connection point between the first and second FETs 4 and 5 is connected to one terminal of the vibrating-type compressor 1, and the connection point between the first and second FETs 14 and 15 is connected to the other terminal of the vibrating-type compressor 1. A resistor R for detecting instantaneous current flowing through the inverter 6 is serially connected to the FET 5.

The first FET 4 and the fourth FET 15, which form a pair, are turned on simultaneously, and the second FET 5 and the third FET 14, which form a pair, are turned on simultaneously. However, these pairs are controlled such that the two pairs alternately turn on over a phase period of 120°, as in the case of the first and second FETs which have been described with reference to FIG. 1.

A power circuit for driving a DC fan motor 18 for cooling the radiator of the refrigerator is connected in parallel to the inverter 6 and receives power from the same power source as that for the inverter 6.

Figure 17:
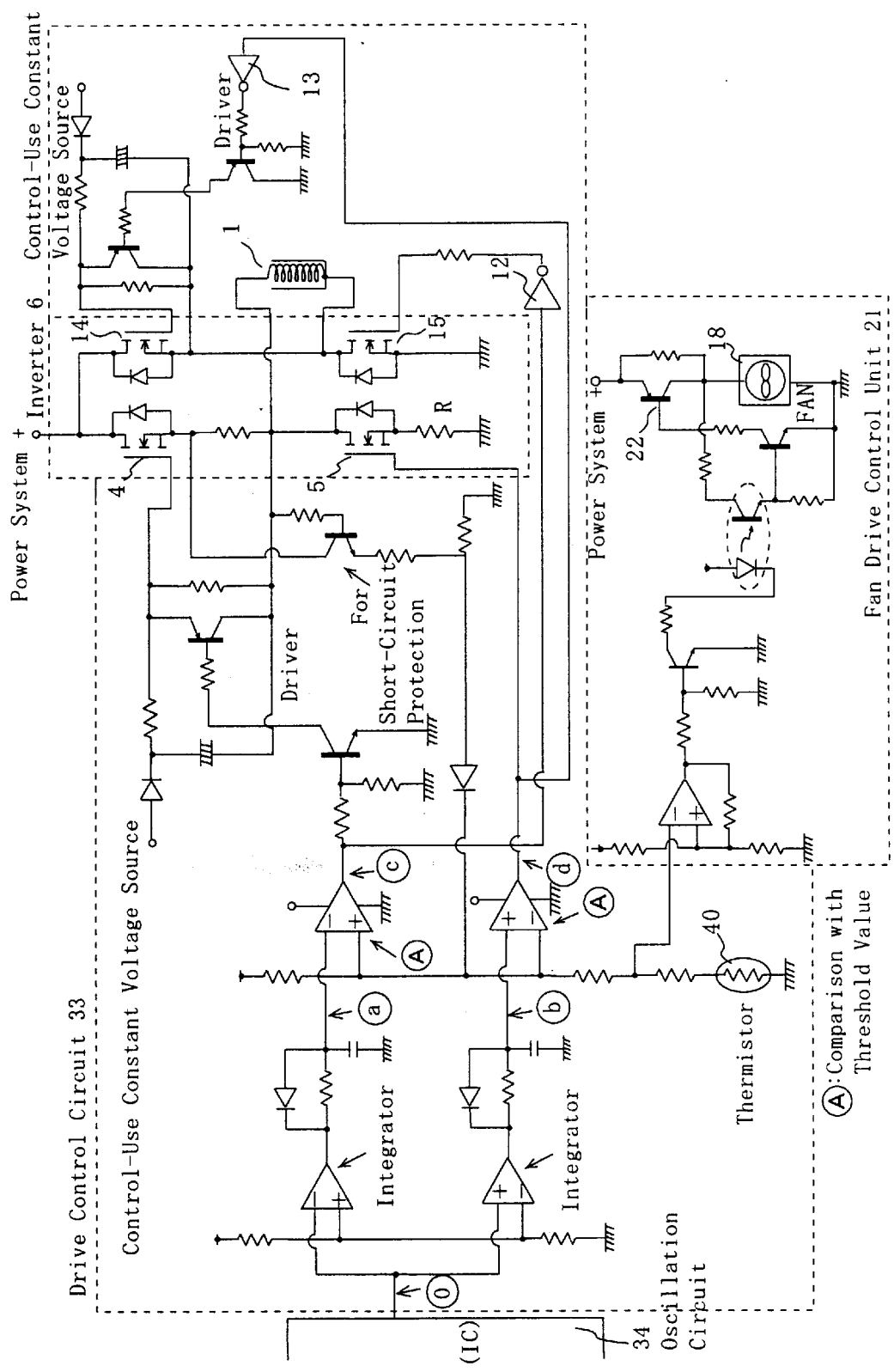
FIG. 17 is a circuit diagram showing the details of a drive control circuit which constitutes the inverter control unit shown in FIG. 16.

FIG. 17 is a circuit diagram showing the details of the drive control circuit 33 which constitutes the inverter control unit 7 shown in FIG. 16. The drive control circuit 33 shown in FIG. 17 differs from that shown in FIG. 6 in that the circuit configuration is modified in order to drive the bridge-type inverter circuit comprising four FETs; i.e., the first through fourth FETs. Descriptions of portions having the same configuration as those shown in FIG. 6 are omitted. As in the circuit shown in FIG. 6, the frequency of pulses output from the first to fourth FETs of the inverter 6 is changed in order to change the frequency of AC voltage applied to the vibrating-type compressor 1. As have been described with reference to FIG. 6, a pulse signal shown in section c of FIG. 7 is supplied to FET 4 of the inverter 6. The pulse signal c is inverted by a driver and is then applied to the FET 4. The pulse signal c is applied to the FET 15 via a polarity inverter 12, which inverts the polarity of the signal. As a result, the signal applied to the FET 15 has the same waveform as that of the signal applied to the FET 4. Similarly, the pulse signal d shown in FIG. 7 is applied to the FET 14 via a polarity inverter 13 and a driver. As a result, the signal applied to the FET 14 has the same waveform as that of the signal applied to the FET 5.

In the above-described manner, the pair including the first FET 4 and the fourth FET 15 and the pair including the second FET 5 and the third FET 14 are turned on alternately such that each FET is in an on state over a 120° phase angle, as have been described with reference to FIG. 6. Thus, the vibrating-type compressor 1 is supplied with an AC voltage having a waveform which includes a 30° dead time, a 120° positive period, a 60° dead time, a 120° positive period, and a 30° dead time in each cycle.

In the present invention, changeover between the battery 2 and the commercial AC power source 10; i.e., changeover between AC and DC, is effected without use of a mechanical changeover unit; instead, the battery 2 and the commercial AC power source 10 are connected by use of a diode OR circuit. This configuration eliminates mechanical contacts from the power system to thereby decrease failure rate; i.e., to improve reliability. Further, since the conversion of AC→DC→AC performed during AC input is simpler than the conventionally practiced conversion of AC→DC→DC→AC, the drive apparatus has improved conversion efficiency and consumes less power.

Further, in the present invention, the FETs disposed in the upper and lower arms of the inverter are turned on alternately such that each FET is in an on state over a 100° to 140° phase angle. Therefore, as compared with 180° alternating supply of electricity, a wave closer to a sinusoidal wave can be supplied to the vibrating-type compressor, whereby the operation efficiency of the vibrating-type compressor itself is improved. Further, since the on period is slightly changed on the basis of the detected ambient temperature of the vibrating-type compressor, the efficiency can be improved further, and the valve-hitting phenomena peculiar to vibrating-type compressors can be prevented.

What is claimed is:
1. A drive apparatus for a vibrating-type compressor, the drive apparatus comprising: a DC power source; an inverter including switching elements and adapted to convert direct current to alternating current through alternating switching of the switching elements; and an inverter control unit for controlling the alternating current supplied from the inverter to the vibrating-type compressor, wherein the DC power source comprises:
a first power supply including a battery and a DC/DC converter for converting direct current from the battery to direct current of a different voltage;
a second power supply including a commercial AC power source and an AC/DC converter for converting alternating current from the commercial AC power source to direct current;
a diode OR circuit to which are connected the first and second power supplies; and
a circuit which, upon detection of a voltage output from the second power supply, operates to stop the output of the first power supply via a DC/DC converter control unit for controlling the DC/DC converter.

2. A drive apparatus for a vibrating-type compressor according to claim 1, wherein
one of two output terminals of the first power supply and one of two output terminals of the second power supply are grounded;
the grounded terminals are connected to one end of a first switching element of the inverter, while the other end of the first switching element is connected in series to one end of a second switching element;
a voltage output from the OR circuit is supplied to the other end of the second switching element;
a current detection resistor is connected in series to one of the two switching elements; and
the connection point between the two switching elements is connected to one end of the vibrating-type compressor via a capacitor, and the one end of the first switching element is connected to the other end of the vibrating-type compressor, thereby enabling the other end of the vibrating-type compressor to be grounded.

3. A drive apparatus for a vibrating-type compressor according to claim 1, wherein the inverter control unit controls, within a phase angle range of 100° to 140°, the on period within each switching cycle of the alternating switching operation of the switching elements.

4. A drive apparatus for a vibrating-type compressor according to claim 1, further comprising a constant voltage generation circuit for supplying a constant voltage for control use to the inverter control unit and the DC/DC converter control unit; and an AC/DC changeover unit which supplies direct current from the battery to the constant voltage generation circuit and supplies output from the AC/DC converter to the constant voltage generation circuit when the drive apparatus is connected to the commercial AC power source.

5. A drive apparatus for a vibrating-type compressor according to claim 4, further comprising a voltage drop detection unit for detecting a fact that voltage output from the AC/DC changeover unit has dropped below a reference value and turning off the output of the constant voltage generation circuit to thereby shut off at least the AC output of the inverter, wherein the detection unit judges a voltage type of a connected commercial power source or battery, and judges whether the detected voltage has dropped in consideration of the voltage type.

6. A drive apparatus for a vibrating-type compressor according to claim 4, wherein a light-emitting diode for displaying the operation state of the drive apparatus is inserted into a main current path between the AC/DC changeover unit and the constant voltage generation circuit.

7. A drive apparatus for a vibrating-type compressor according to claim 4, wherein the output voltage of the AC/DC converter is set not to overlap a range of the battery voltage, and the AC/DC changeover unit connects the output of the AC/DC converter and the battery by use of a diode OR connection.

8. A drive apparatus for a vibrating-type compressor according to claim 2, wherein a DC fan motor is connected between the opposite terminals of the capacitor.

9. A drive apparatus for a vibrating-type compressor according to claim 1, wherein the inverter control unit detects and holds a first peak of current flowing during a half cycle of an AC output, detects a timing at which the current again reaches the level the held peak, and controls the timing of the alternative switching of the switching elements of the inverter to thereby variably control the output frequency of the inverter.

10. A drive apparatus for a vibrating-type compressor according to claim 3, wherein the on phase period of 100° to 140° is varied on the basis of a detected ambient temperature of the vibrating-type compressor.

11. A drive apparatus for a vibrating-type compressor, the drive apparatus comprising: a DC power source; an inverter including switching elements and adapted to convert direct current to alternating current through alternating switching of the switching elements; and an inverter control unit for controlling the alternating current supplied from the inverter to the vibrating-type compressor, wherein
the inverter control unit controls, within a phase angle range of 100° to 140°, the on period within each switching cycle of the alternating switching operation of the switching elements the switching elements being turned off together for each period between each of the on periods.

12. A drive apparatus for a vibrating-type compressor according to claim 11, wherein the on phase period of 100° to 140° is varied on the basis of a detected ambient temperature of the vibrating-type compressor.

13. A drive apparatus for a vibrating-type compressor according to claim 11, wherein the inverter control unit detects and holds a first peak of current flowing during a half cycle of an AC output, detects a timing at which the current again reaches the level of the held peak, and controls the timing of the alternative switching of the switching elements of the inverter to thereby variably control the output frequency of the inverter.

14. A drive apparatus for a vibrating-type compressor according to claim 13, further comprises a circuit for stopping the operation of the inverter when a value obtained through integration of instantaneous values the current exceeds a reference value.

15. A drive apparatus for a vibrating-type compressor according to claim 11, wherein the DC power supply is configured to supply direct current selectively from a first power supply including a DC/DC converter for converting direct current from a battery to direct current of a different voltage, and a second power supply including an AC/DC converter for converting alternating current from a commercial AC power source to direct current; and the DC power supply includes a constant voltage generation circuit for supplying a constant voltage for control use to the inverter control unit and the DC/DC converter control unit, and an AC/DC changeover unit which supplies direct current from the battery to the constant voltage generation circuit and supplies output from the AC/DC converter to the constant voltage generation circuit when the drive apparatus is connected to the commercial AC power source.

16. A drive apparatus and compressor, comprising: vibrating-type compressor;

an inverter including switching elements and adapted to convert direct current to alternating current through alternating switching of the switching elements;

an in inverter control unit for controlling the alternating current supplied from the inverter to the vibrating-type compressor; and a DC power source connected to the inverter, the DC power source including a first power supply with a battery and a DC/DC converter for converting direct current from the battery to direct current of a different voltage, a second power supply associated with an AC power source and an AC/DC converter for converting alternating current from the AC power source to direct current, a diode OR Circuit to which are connected the first and second power supplies and a circuit which operates to stop the output of the first power supply via a DC/DC converter control unit for controlling the DC/DC converter upon detection of a voltage output from the second power supply.

17. A drive apparatus and compressor according to claim 16, wherein one of two output terminals of the first power supply and one of two output terminals of the second power supply are grounded;

the grounded terminals are connected to one end of a first switching element of the inverter, while the other end of the first switching element is connected in series to one end of a second switching element;

a voltage output from the OR circuit is supplied to the other end of the second switching element;

a current detection resistor is connected in series to one of the two switching elements; and the connection point between the two switching elements is connected to one end of the vibrating-type compressor via a capacitor, and the one end of the first switching element is connected to the other end of the vibrating-type compressor, thereby enabling the other end of the vibrating type compressor to be grounded.

18. A drive apparatus and compressor according to claim 16, wherein the inverter control unit controls, within a phase angle range of 100° to 140°, the on period within each switching cycle of the alternating switching operation of the switching elements.

19. A drive apparatus for a vibrating-type compressor according to claim 16, wherein the DC power source further comprises a constant voltage generation circuit for supplying a constant voltage for control use to the inverter control unit and the DC/DC converter control unit and an AC/DC changeover unit which supplies direct current from the battery to the constant voltage generation circuit and supplies output from the AC/DC converter to the constant voltage generation circuit when the drive apparatus is connected to the commercial AC power source.

20. A drive apparatus for a vibrating-type compressor according to claim 4, wherein the DC power source further comprises a voltage drop detection unit for detecting a fact that voltage output from the AC/DC changeover unit has dropped below a reference value and turning off the output of the constant voltage generation circuit to thereby shut off at least the AC output of the inverter, wherein the detection unit judges a voltage type of a connected commercial power source or battery, and judges whether the detected voltage has dropped in consideration of the voltage type.

* * * * *